(12) United States Patent
Kim

(10) Patent No.: US 7,095,406 B2
(45) Date of Patent: Aug. 22, 2006

(54) DRIVING INTEGRATED CIRCUIT UNIT FOR A LIQUID CRYSTAL DISPLAY DEVICE

(75) Inventor: Woo-Hyun Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 241 days.

(21) Appl. No.: 10/114,459

(22) Filed: Apr. 3, 2002

(65) Prior Publication Data
US 2002/0145696 A1 Oct. 10, 2002

(30) Foreign Application Priority Data
Apr. 9, 2001 (KR) .............................. 2001-18719

(51) Int. Cl.
G09G 5/00 (2006.01)
H05K 1/00 (2006.01)
G02F 1/1345 (2006.01)

(52) U.S. Cl. ................... 345/206; 345/204; 361/749; 349/150

(58) Field of Classification Search ............. 349/150; 345/87–93; 257/59, 72; 359/591; 361/749
See application file for complete search history.

(56) References Cited
U.S. PATENT DOCUMENTS
6,008,532 A 12/1999 Carichner
6,128,063 A * 10/2000 Uchiyama et al. .......... 349/150
6,307,216 B1 * 10/2001 Huh et al. .................. 257/59
6,580,559 B1 * 6/2003 Doll et al. .................. 359/591
6,590,226 B1 * 7/2003 Kong et al. ................. 257/59
6,710,372 B1 * 3/2004 Kim ........................... 257/72

FOREIGN PATENT DOCUMENTS
KR 2001-4545 1/2001

* cited by examiner

Primary Examiner—Sumati Lefkowitz
Assistant Examiner—Srilakshmi K. Kumar
(74) Attorney, Agent, or Firm—McKenna Long & Aldridge LLP

(57) ABSTRACT

A integrated circuit driving unit for a LCD device includes a base film having first and second regions; first and second input lines on the base film; first and second output lines on the base film; first and second input pads at a boundary of the base film connected to one end of each of the first and second input lines, respectively; first and second output pads at a boundary of the base film connected to one end of each of the first and second output lines; first and second input terminals in the first and second regions of the base film connected to the other end of each of the first and second input lines, respectively; and first and second output terminals in the first and second regions of the base film connected to the other end of each of the first and second output lines, respectively.

18 Claims, 6 Drawing Sheets

DRIVING INTEGRATED CIRCUIT UNIT FOR A LIQUID CRYSTAL DISPLAY DEVICE

This application claims the benefit of Korean Patent Application No. 2001-18719, filed on Apr. 9, 2001, which is hereby incorporated by reference as if fully set forth herein.

BACKGROUND OF THE INVENTION

1. Field of the Invention

The present invention relates to a liquid crystal display (LCD) device, and more particularly to a driving integrated circuit (IC) unit for an LCD device.

2. Description of the Related Art

LCD devices having small size, lightweight, and low power consumption may solve problems related to cathode ray tube (CRT) devices. Accordingly, LCD devices have been a subject of recent research. The LCD device is a non-emissive display device including a liquid crystal layer sandwiched between array and color filter substrates. Of the different types of known LCD devices, active matrix LCD (AM-LCD) devices, which have thin film transistors and pixel electrodes arranged in a matrix pattern, are the subject of significant research and development because of their high resolution and superiority in displaying moving images.

The LCD device comprises an LCD module having a driving circuit unit and a backlight unit.

FIG. 1 illustrates a schematic cross-sectional view of a conventional LCD module.

In FIG. 1, a conventional LCD module 2 includes a liquid crystal display panel 10, a backlight unit 30, and a driver unit 50. The liquid crystal display panel 10 includes an upper substrate 12, also referred to as a color filter substrate, and a lower substrate 14, also referred to as an array substrate. A liquid crystal layer 15 is interposed between the upper and lower substrates 12 and 14 and a thin film transistor (TFT) "T", to which a driving signal is applied from the driver unit 50, is formed on the lower substrate 14. The TFT "T" has a gate electrodes 16, source and drain electrodes 18 and 20, connected to a gate line, a data line (not shown) and a pixel electrode 22 applying a voltage to the liquid crystal layer 15, respectively. On the other hand, the driver unit 50 has a printed circuit board (PCB) 53 and a driving IC unit 54 including a driving IC 52.

Generally, the driving IC unit 54 is attached to the liquid crystal display panel 10 using an anisotropic conductive film. In conventional or low resolution type LCDs, the PCB having the driving IC can be easily attached to the liquid crystal display panel by a heat seal connector (HSC) because the driving IC does not have many leads. However, as the resolution of liquid crystal display panels increase, a driving IC has many leads and becomes harder to attach to the PCB. For example, a liquid crystal display panel having 600×800 pixels in super video graphics adapter (SVGA) requires 600×800×3 sub pixels, also known as dots, to display colors. All of the sub pixels need to be connected to the driving IC through a separate lead wire.

To solve the above-mentioned problems, a tape automated bonding (TAB) has been suggested. A TAB type driving IC is easily attached to a high resolution liquid crystal display by loading the TAB type driving IC onto a tape carrier. As shown in FIG. 1, the TAB type driving IC is loaded onto a tape carrier package (TCP) and is mainly used within the driving IC unit 54. Recently, a chip on flexible printed circuit (COF) type driving IC has been researched. Since the COF type driving IC is loaded on a more flexible film than in the TCP type driving IC, the thickness of the COF type driving IC unit is reduced so that a fine pad pitch may be formed.

FIG. 2 illustrates a schematic plan view showing a relationship between a driving IC and an LCD panel of a conventional LCD module.

In FIG. 2, gate and source electrodes 16 and 18 of the LCD module 2 are connected to gate and data lines 17 and 19, respectively. In a pixel region defined by the gate and data lines 17 and 19, red (R), green (G), and blue (B) sub pixels are sequentially disposed to compose one pixel "P".

The driving IC 52 functions as an interface between the LCD panel 10 and the driving unit. The driving IC 52 includes a gate driving IC 52a and a source driving IC 52b. The gate driving IC 52a is disposed at each of the right and left sides of the LCD panel 10 and turns a TFT "T" on or off by sequentially applying a driving voltage to the gate line 17. The source driving IC 52b is disposed at each of the top and bottom of the LCD panel 10 and applies a signal voltage to the data line 19 and transfer a data voltage to a liquid crystal layer through the TFT turned on.

The LCD module 2 is driven by alternating current (AC) to prevent direct current (DC) from weakening the liquid crystal layer the LCD. The AC driving method also prevents a degradation of display quality (e.g., flicker) due to a pixel voltage variation according to a field and a residual image that occurs when a still image is displayed for a long time. For the AC driving method, a line inversion driving method is mainly used. In the line inversion driving method, positive (+) signals are applied to the data lines when one gate line is turned on and negative (−) signals are applied to the data lines when the next gate line is turned on.

At the ends of the gate and data lines 17 and 19, gate and data pads (not shown) are formed, respectively. A plurality of output pads corresponding to the gate and data pads are formed in the driving IC 52.

FIG. 3 illustrates a schematic plan view of a conventional driving IC unit of a COF type for a LCD device.

In FIG. 3, the driving IC unit 54 includes a base film 58 and a plurality of input lines 68 and output lines 70 are formed on the base film 58 along a first direction. At one end of each input line 68 and each output line 70 near a boundary of the base film 58, input pads 64 and output pads 66 are disposed, respectively. At the other end of each input line 68 and each output line 70, in a middle of the base film 58, input terminals 60 and output terminals 62 are disposed, respectively. The input pad 64 is connected to a PCB (not shown) and an input signal is transferred from the PCB to the input pad 64. The output pad 66 is connected to gate or data pads of an LCD panel as illustrated in FIG. 2. Furthermore, a driving IC 56 connected to the input and output terminals 60 and 62 is formed on the base film 58.

Generally, since the resolution of an LCD module is determined by a number of gate and data lines, a compact LCD module of high resolution can be realized by forming a driving IC having a fine pad pitch. The minimum pad pitches of TCP type and COF type driving ICs are within a range of about 70 to about 75 micrometers and about 50 micrometers, respectively. Since the COF type driving IC is thinner than that of the TCP type, the distance between pads may be reduced due to a taper angle present in the COF type driving IC.

FIG. 4 illustrates a schematic cross-sectional view taken along a line IV—IV of FIG. 3. A base film and a driving IC are not shown for convenience of explanation. Since an output terminal has a size corresponding to an output pad, the pitch between output terminals may be referred as a pad pitch.

In FIG. 4, the pad pitch "pp" may be expressed as follows.

$1pp(50\ \mu m)=2a(30\ \mu m)+d(20\ \mu m)$ where "a" is a half width of the output terminal 62 and "d" is a distance between output terminals 62.

The degree of pad pitch may be measured by calculating the number of the output lines per inch (2.54 cm=25400 μm) capable of being designed using one pad pitch "pp". Since the number of output lines corresponding to one pad pitch "pp" is one, the number of output lines per inch is 508. (25400 μm/50 μm=508 EA/inch) Since one pixel is composed of three sub pixels, the number of output terminals per inch corresponds to a maximum of 170 pixels/inch. (508/3=170)

It is difficult to form LCD devices having a display of 200 pixels per inch (PPI) while employing COF type driving IC units according to the single bank method, where source driving ICs are disposed at only one side of the LCD panel. Even though the pixel pitch of the 200 PPI LCD device is calculated as 42 μm, the pad pitch, being narrower than the pixel pitch (e.g., less than 40 μm), is conventionally difficult to fabricate.

Since clock frequency increases as operating speed and resolution increases, driving ICs having corresponding clock frequencies for ultra high resolution LCD devices (e.g., over quadruple extended graphics adapter (QXGA) having 2048× 1536 pixels) are not easily fabricated according to the single bank method. To improve the problems associated with the single bank method, a double bank method has been suggested. In the double bank method, data driving IC units are disposed at both sides of the LCD panel.

FIG. 5 illustrates a schematic plan view showing an LCD module of a conventional double bank method.

In FIG. 5, the LCD module of the conventional double bank method processes signals at driving IC units 72 of both sides so that high speed driving can be achieved at high resolution. However, as the area of the driving IC units 72 increases and processes of the driving IC and module become complex, the LCD device driven according to the double bank method is not easily made compactly is associated with high fabrication costs.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display module of high resolution, low fabrication cost, and simple process by attaching a plurality of driving ICs without increasing a width of a driving IC unit.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a driving integrated circuit unit for a liquid crystal display device includes a base film having at least first and second regions, a plurality of first and second input lines on the base film; a plurality of first and second output lines on the base film, a plurality of first and second input pads at a boundary of the base film, wherein each of the first and second input pads are connected to one end of each of the first and second input lines, respectively, a plurality of first and second output pads at a boundary of the base film, wherein each of the first and second output pads are connected to one end of each of the first and second output lines, respectively, a plurality of first and second input terminals in the first and second regions of the base film, respectively, wherein each of the first and second input terminals are connected to the other end of each of the first and second input lines, respectively, and a plurality of first and second output terminals in the first and second regions of the base film, respectively, wherein each of the first and second output terminals are connected to the other end of each of the first and second output lines, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 6:
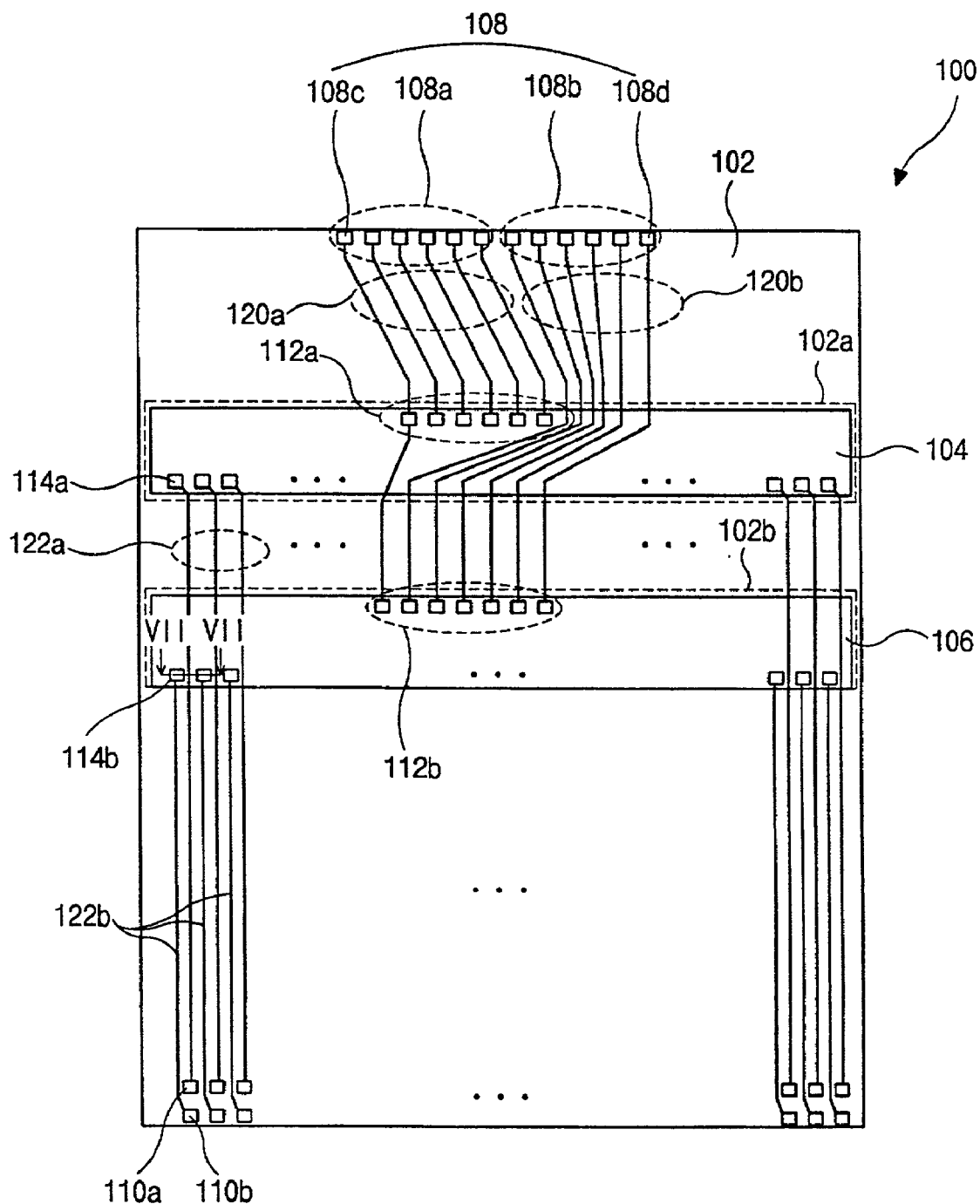
FIG. 6 illustrates a schematic plan view of a driving IC unit for an LCD module according to an embodiment of the present invention.

FIG. 6 illustrates a schematic plan view of a driving IC unit for an LCD module according to an embodiment of the present invention.

In FIG. 6, a plurality of first and second input lines 120a and 120b and a plurality of first and second output lines 122a and 122b are disposed on a base film 102 having first and second regions 102a and 102b. Furthermore, a plurality of first and second input pads 108a and 108b, and a plurality of first and second output pads 110a and 110b are disposed at a boundary of the base film 102. Each of first and second input pads 108a and 108b are connected to one end of each of first and second input lines 120a and 120b, respectively. Each of first and second output pads 110a and 110b are connected to one end of each of first and second output lines 122a and 122b, respectively.

Furthermore, a plurality of first and second input terminals 112a and 112b are formed at the first and second regions 102a and 102b of the base film 102, respectively. Each of first and second input terminals 112a and 112b are connected to the other end of each of first and second input lines 120a and 120b, respectively. Also, a plurality of first and second output terminals 114a and 114b are formed at the first and second regions 102a and 102b of the base film 102, respectively. Each of first and second output terminals 114a and 114b are connected to the other end of each of first and second output lines 122a and 122b, respectively. The plurality of first input and output terminals 112a and 114a oppose each other and a first driving IC 104 is connected therewith. Also, the plurality of second input and output terminals 112b and 114b oppose each other and a second driving IC 106 is connected therewith.

Start and end pulse signals are applied to one pad 108c of the plurality of first input pads 108a and one pad 108d of the plurality of second input pads 108b, respectively. Even and odd pulse signals are applied to the others of the plurality of first input pads 108a and the others of the plurality of second input pads 108b, respectively. The one pad 108c of the plurality of first input pads 108a is connected to both a first input pad and a second input pad so that the first and second driving ICs 104 and 106 can be simultaneously driven. On the other hand, the one pad 108d of the plurality of second input pads 108b is connected to only a second input pad. After applying even and odd pulse signals to the first and second driving ICs, the end pulse signal is outputted from the connected second input pad to the one pad 108d of the plurality of second input pads 108b and then transferred to a next driving IC (not shown) as a start pulse.

Even though each of the first and second driving ICs 104 and 106 is driven with a line inversion driving method, the first and second driving ICs 104 and 106 are alternately driven for even and odd pulse signals so that an effect of a dot inversion driving method can be obtained. Generally, the line inversion driving method has advantages in cost and power consumption but disadvantages in display quality in contrast with the dot inversion driving method. In the present invention, a line inversion driving method with the high display quality of the dot inversion driving method is realized.

Furthermore, a plurality of driving ICs are loaded on a driving IC unit so that a single bank method with high speed and compact size can be realized in the present invention. In the case of applying a driving IC unit of a conventional single bank method to a LCD device of high resolution, a fine pad pitch is difficult to fabricate. However, in the present invention, a fine pad pitch is realized by loading a plurality of driving ICs on a driving IC unit and divisionally applying signals to the plurality of driving ICs.

Figure 7:
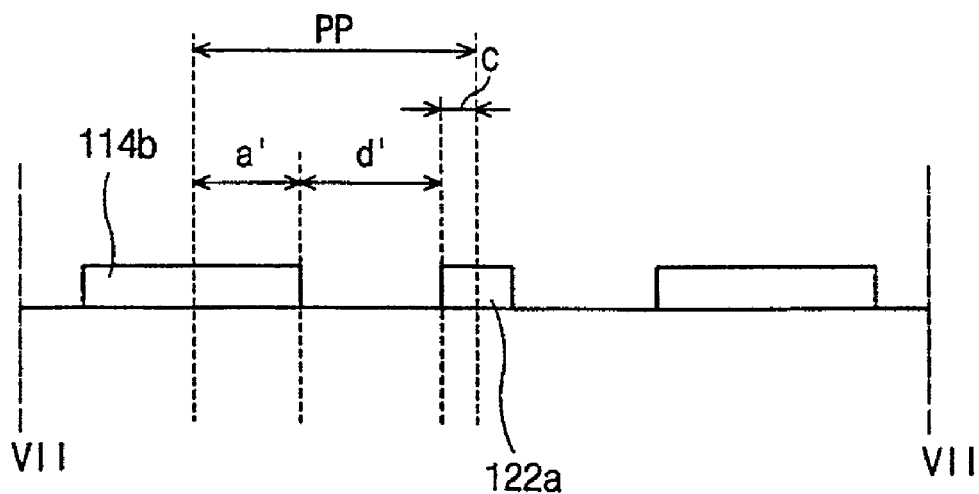
FIG. 7 illustrates a schematic cross-sectional view taken along a line VII—VII of FIG. 6.

FIG. 7 illustrates a schematic cross-sectional view taken along a line VII—VII of FIG. 6. Illustrations of the driving IC and base film are omitted as a matter of convenience of explanation.

In FIG. 7, a plurality of second output terminals 114b and a plurality of first output lines 122a are alternately disposed on a base film (not shown). A distance "d'" between the second output terminal 114b and the first output line 122a is designed to be at least about 20 μm to prevent shortage. A width of the first output line 122a is designed to be about 10 μm. A pad pitch "PP" according to an embodiment of the present invention is defined as a distance between a center of the second output terminal 114b and a center of the first output line 122a and expressed as follows.

$$1PP'(40\ \mu m) = a'(15\ \mu m) + d'(20\ \mu m) + c'(5\ \mu m)$$

where "a'" is a half width of the second output terminal 114b, "d'" is a distance between the second output terminal 114b and the first output line 122a and "c'" is a half width of the first output line 122a.

Figure 1:
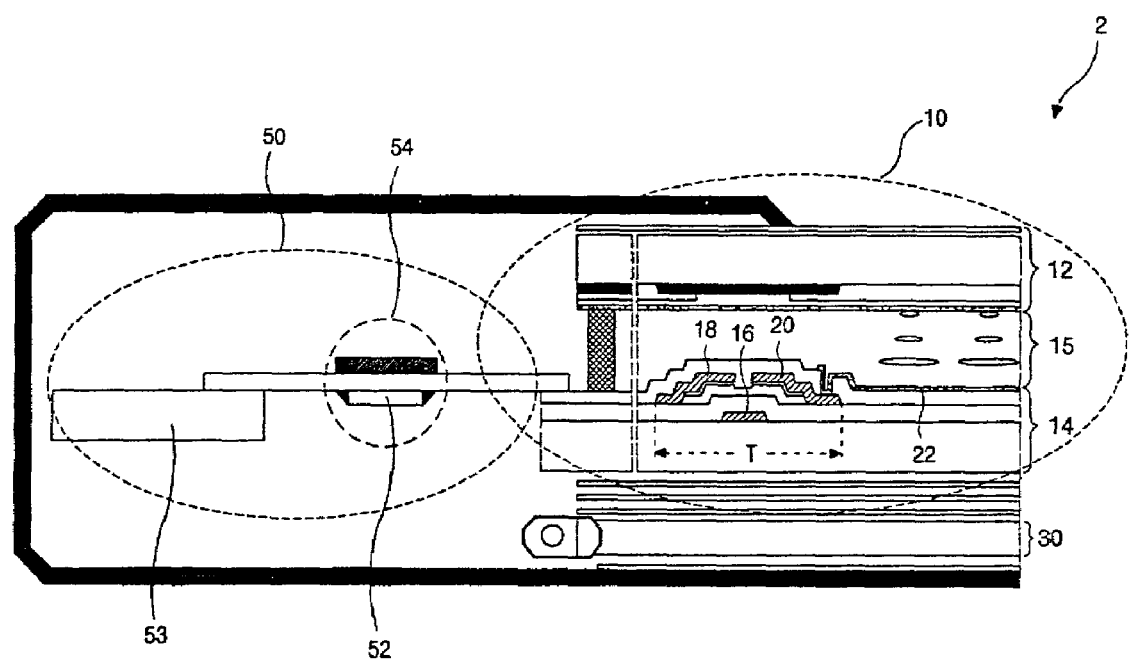
FIG. 1 illustrates a schematic cross-sectional view of a conventional LCD module.
Figure 2:
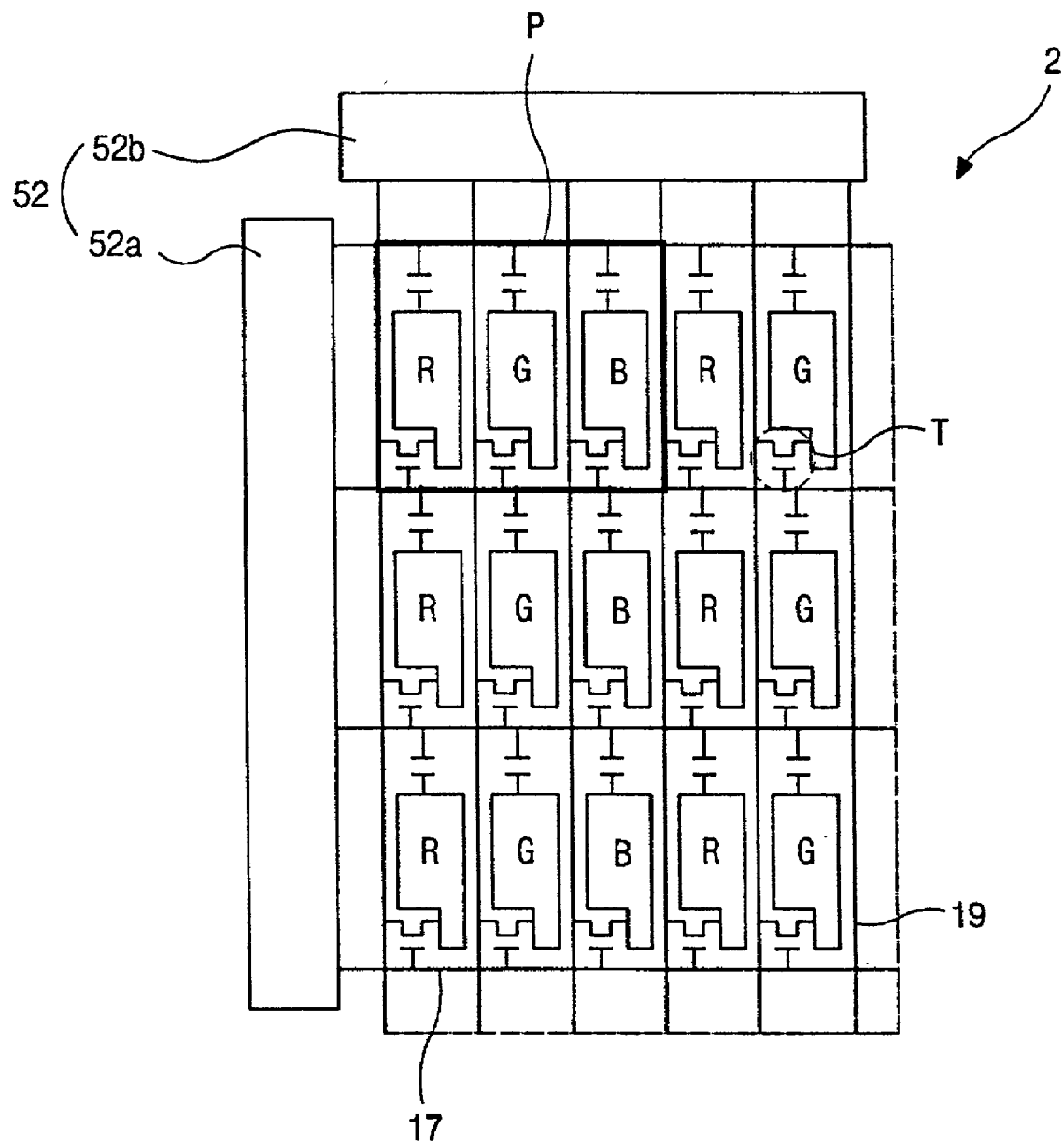
FIG. 2 illustrates a schematic plan view showing a relation between a driving IC and an LCD panel of a conventional LCD module.
Figure 3:
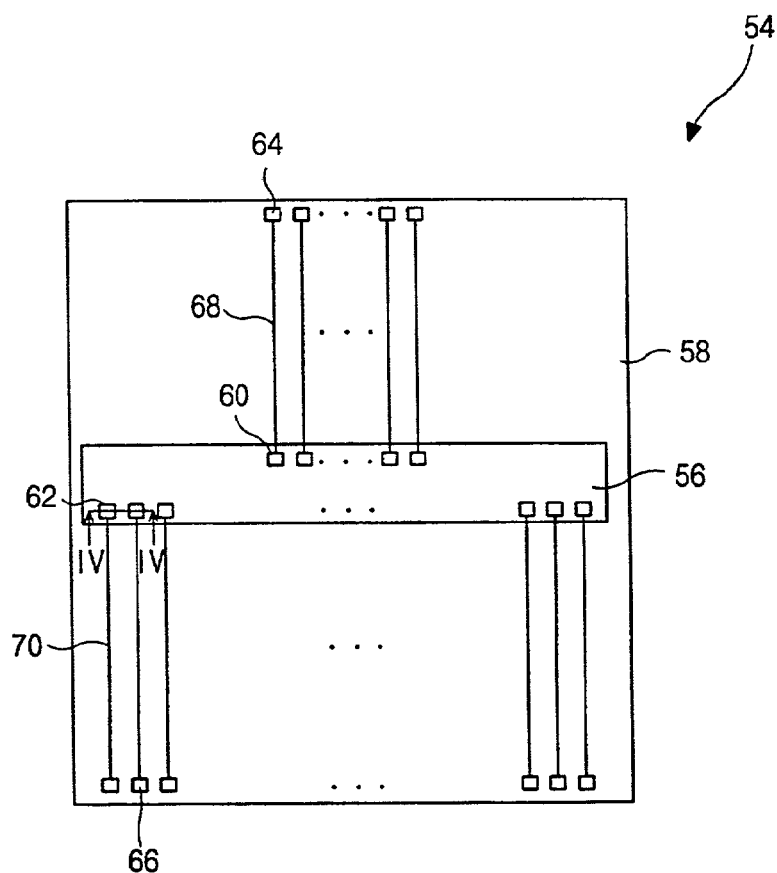
FIG. 3 illustrates a schematic plan view of a conventional driving IC unit of a COF type for a LCD device.
Figure 4:
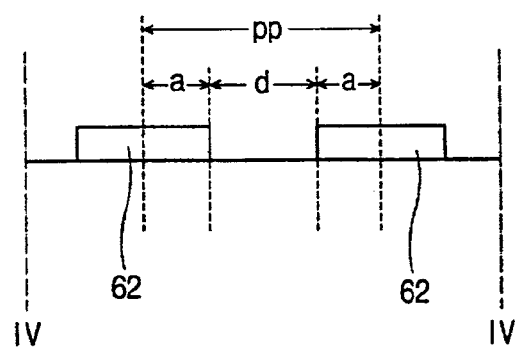
FIG. 4 illustrates a schematic cross-sectional view taken along a line IV—IV of FIG. 3.
Figure 5:
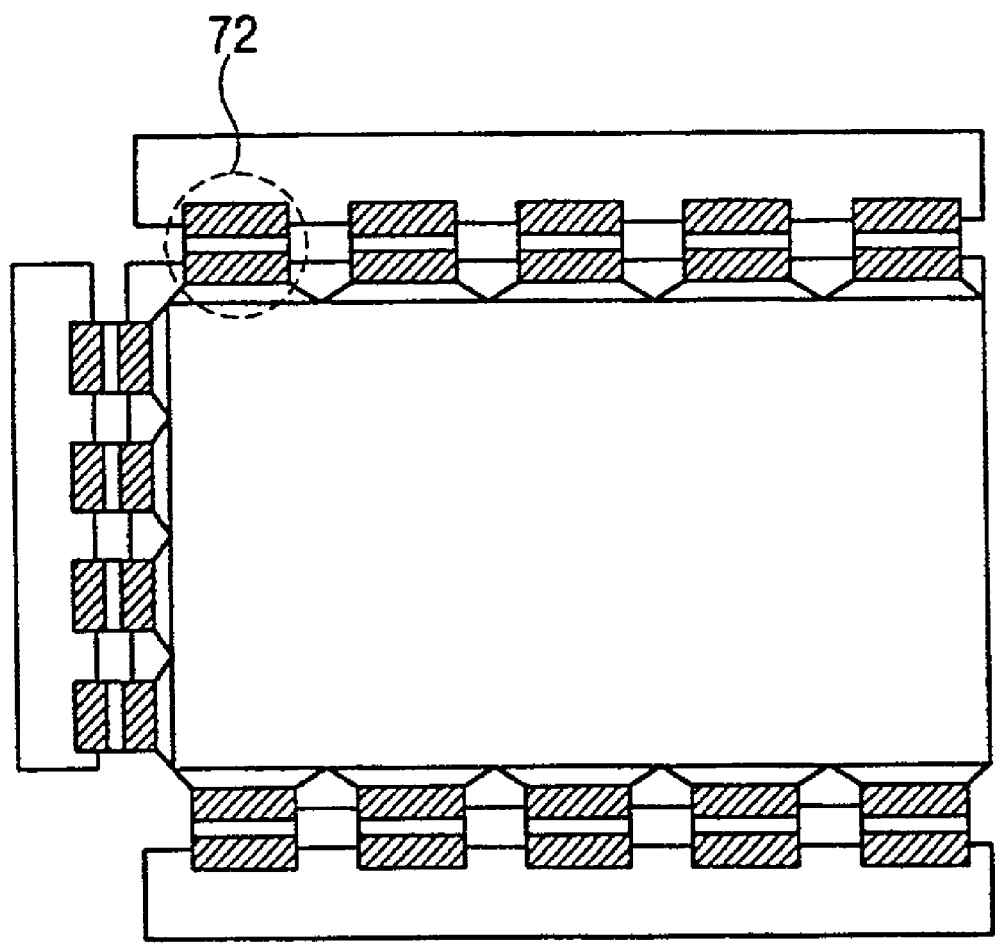
FIG. 5 illustrates a schematic plan view showing an LCD module of a conventional double bank method.

Therefore, the number of output lines per inch according to the aforementioned pad pitch "PP" is about 635. (25400 μm/40 μm=635 EA/inch) In contrast with the number of output lines per inch of FIG. 4, 127 output lines per inch is added so that the resolution of the driving IC unit can be used in an LCD having more than 200 PPI.

Furthermore, at least two driving ICs may be loaded on the driving IC unit without increasing a width of the driving IC unit. As the number of driving ICs increases, the pad pitch can be designed more finely.

Figure 8:
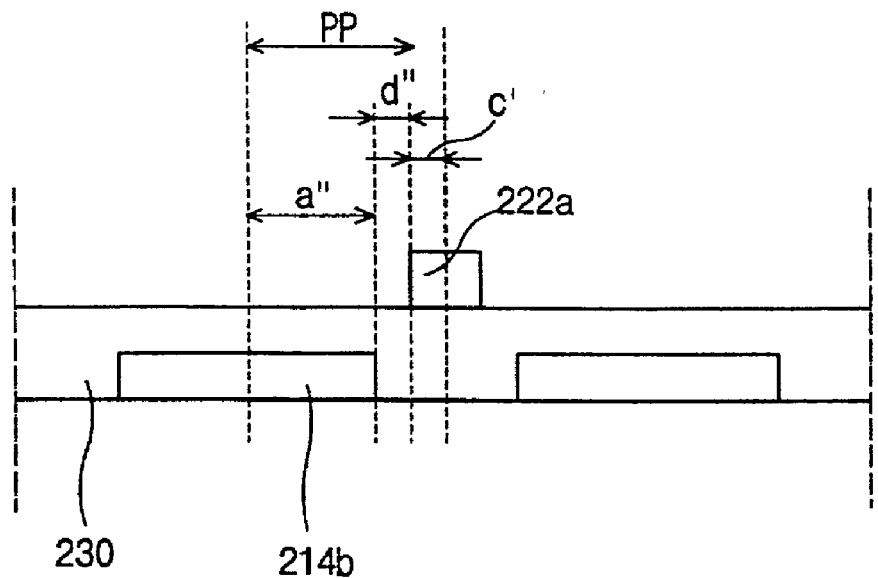
FIG. 8 illustrates a cross-sectional view of a COF type driving IC unit for a LCD device according to another embodiment of the present invention.

FIG. 8 illustrates a cross-sectional view of a COF type driving IC unit for a LCD device according to another embodiment of the present invention. As in FIG. 7, illustrations of the driving IC and base film are omitted as a matter of convenience of explanation.

In FIG. 8, a plurality of second output terminals 214b are formed on the base film (not shown) and an insulating layer 230 is formed on the plurality of second output terminals 214b. Then, a plurality of first output lines 222a are formed on the insulating layer 230. In the case of forming the plurality of output terminals and output lines of the driving IC unit as a same layer, a distance between the output terminal and output line is at least about 20 μm. However, in the embodiment of FIG. 8, the distance between the output terminal 214b and output line 222a is reduced to a range of about 5 to about 10 μm using the insulating layer 230 so that the pad pitch "PP'" can be minimized to about 25 μm. The pad pitch can be calculated as follows.

$$1PP''(25\ \mu m) = a''(15\ \mu m) + d''(5\ \mu m) + c'(5\ \mu m)$$

where "a'" is a half width of the second output terminal 214b, "d'" is a distance between the second output terminal 214b and the first output line 222a and "c'" is a half width of the first output line 222a. Therefore, a number of output lines per inch according to the pad pitch "PP'" is about 1016 (25400 μm/25 μm=1016 EA/inch) corresponding to about 339 PPI. Even though an additional fabricating process of forming the insulating layer is required, a compact, high resolution LCD device may be provided due to an even finer pad pitch.

Consequently, a compact LCD module fabricated using the single bank method and having a plurality of driving ICs without increasing a width of a driving IC unit may be provided. Moreover, since data signals are divisionally processed in the plurality of driving ICs, an effect of a dot inversion driving method can be achieved by processing the data signals using the line inversion method. Therefore, an LCD module having low fabrication cost, low power consumption, and high display quality is provided.

It will be apparent to those skilled in the art that various modifications and variation can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A driving integrated circuit (IC) unit in a liquid crystal display device, comprising:
   a base film having first and second regions;
   a plurality of first and second input lines on the base film;
   a plurality of first and second output lines on the base film;
   a plurality of first and second input pads at a boundary of the base film, wherein each of the first and second input pads are connected to one end of each of the first and second input lines, respectively;
   a plurality of first and second output pads at a boundary of the base film, wherein each of the first and second output pads are connected to one end of each of the first and second output lines, respectively;
   a plurality of first and second input terminals in the first and second regions of the base film, respectively, wherein each of the first and second input terminals are connected to the other end of each of the first and second input lines, respectively; and
   a plurality of first and second output terminals in the first and second regions of the base film, respectively, wherein each of the first and second output terminals are connected to the other end of each of the first and second output lines, respectively,
   wherein the first region is between the plurality of first and second input pads and the plurality of first and second output pads, and
   wherein the second region is between the first region and the plurality of first and second output pads.

2. The driving IC unit according to claim 1, wherein the plurality of first and second input lines are disposed alternately.

3. The driving IC unit according to claim 1, wherein the plurality of first and second output lines are disposed alternately.

4. The driving IC unit according to claim 1, further comprising a plurality of first and second driving integrated circuits disposed in the first and second regions of the base film, respectively.

5. The driving IC unit according to claim 1, wherein one of the plurality of first input pads is also connected to one of the plurality of second input pads, a start pulse signal thereby being applied to the one of the plurality of first input pads.

6. The driving IC unit according to claim 1, wherein an end pulse signal is applied to one of the plurality of second input pads.

7. The driving IC unit according to claim 6, wherein the one of the plurality of second input pads is connected to one of a plurality of first input pads in a next driving integrated circuit unit, whereby the end pulse signal is a start pulse signal of the next driving integrated circuit unit.

8. The driving IC unit according to claim 1, wherein an insulating layer is formed on the plurality of second output terminals and the plurality of first output lines is formed on the insulating layer.

9. The driving IC unit according to claim 8, wherein a distance between first output line and adjacent second output pad is within a range of about 5 to about 10 micrometers.

10. A method of forming a driving IC unit in a liquid crystal display device, comprising:
    providing a base film having first and second regions;
    forming a plurality of first and second input lines on the base film;
    forming a plurality of first and second output lines on the base film;
    forming a plurality of first and second input pads at a boundary of the base film, wherein each of the first and second input pads are connected to one end of each of the first and second input lines, respectively;
    forming a plurality of first and second output pads at a boundary of the base film, wherein each of the first and second output pads are connected to one end of each of the first and second output lines, respectively;
    forming a plurality of first and second input terminals in the first and second regions of the base film, respectively, wherein each of the first and second input terminals are connected to another end of each of the first and second input lines, respectively; and
    forming a plurality of first and second output terminals in the first and second regions of the base film, respectively, wherein each of the first and second output terminals are connected to another end of each of the first and second output lines, respectively,
    wherein the first region is between the plurality of first and second input pads and the plurality of first and second output pads, and
    wherein the second region is between the first region and the plurality of first and second output pads.

11. The method of forming the driving IC unit according to claim 10, further comprising alternately disposing the plurality of first and second input lines.

12. The method of forming the driving IC unit according to claim 10, further comprising alternately disposing the plurality of first and second output lines.

13. The method of forming the driving IC unit according to claim 10, further comprising disposing a plurality of first and second driving integrated circuits in the first and second regions of the base film, respectively.

14. The method of forming the driving IC unit according to claim 10, further comprising:
    connecting one of the plurality of first input pads to one of the plurality of second input pads; and
    applying a start pulse signal to the one of the plurality of first input pads.

15. The method of forming the driving IC unit according to claim 10, further comprising applying an end pulse signal to one of the plurality of second input pads.

16. The method of forming the driving IC unit according to claim 15, further comprising:
    connecting the one of the plurality of second input pads to one of a plurality of first input pads in a next driving integrated circuit unit, such that the end pulse signal is a start pulse signal of the next driving integrated circuit unit.

17. The method of forming the driving IC unit according to claim 10, further comprising:
    forming an insulating layer on the plurality of second output terminals; and
    forming the plurality of first output lines on the insulating layer.

18. The method of forming the driving IC unit according to claim 17, wherein a distance between first output line and adjacent second output pad is within a range of about 5 to about 10 micrometers.

* * * * *